United States Patent
Navon et al.

(10) Patent No.: US 11,216,696 B2
(45) Date of Patent: Jan. 4, 2022

(54) TRAINING DATA SAMPLE SELECTION FOR USE WITH NON-VOLATILE MEMORY AND MACHINE LEARNING PROCESSOR

(71) Applicant: Western Digital Technologies, Inc., San Jose, CA (US)

(72) Inventors: Ariel Navon, Revava (IL); Shay Benisty, Beer Sheeva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 59 days.

(21) Appl. No.: 16/784,077

(22) Filed: Feb. 6, 2020

(65) Prior Publication Data
US 2021/0248416 A1    Aug. 12, 2021

(51) Int. Cl.
| G06K 9/62 | (2006.01) |
|---|---|
| G06N 3/08 | (2006.01) |
| G06N 20/00 | (2019.01) |

(52) U.S. Cl.
CPC ......... *G06K 9/6256* (2013.01); *G06K 9/6221* (2013.01); *G06N 3/08* (2013.01); *G06N 20/00* (2019.01)

(58) Field of Classification Search
CPC ............. G06K 9/6256; G06K 9/00335; G06K 9/6223; G06K 9/6259; G06K 9/6262;
(Continued)

(56) References Cited

U.S. PATENT DOCUMENTS

| 10,013,652 B2 | 7/2018 | Vlietinck et al. |
| 10,387,303 B2 | 8/2019 | Mehra et al. |
| (Continued) |

OTHER PUBLICATIONS

Pattnaik, et al.; "Scheduling Techniques for GPU Architectures with Processing-In-Memory Capabilities", 2016 International Conference on Parallel Architecture and Compilation Techniques, Sep. 2016, pp. 31-44, DOI: http://dx.doi.org/10.1145/2967938.2967940 <https://ieeexplore.ieee.org/document/7756764>.

(Continued)

*Primary Examiner* — Ajibola A Akinyemi
(74) *Attorney, Agent, or Firm* — Loza & Loza, LLP; Gabriel Fitch

(57) ABSTRACT

Exemplary methods and apparatus are provided for configuring a data storage controller to select training data samples from a non-volatile memory (NVM) array for forwarding to an external machine learning processor. The machine learning processor trains a deep neural network model by, e.g., performing various forward and backward passes through a neural network. Within illustrative examples, the data storage controller is equipped with a data sample selection unit that intelligently selects training data stored in the NVM array to forward to the external machine learning processor to reduce an amount of training data to be transferred to the machine learning processor. Among other features, this allows for the practical use of NVM arrays (such as NAND memory arrays) for storing large quantities of machine learning training data, rather than high-speed volatile memory (such as dynamic random access memory), which may be impractical and cost-prohibitive for low-power applications.

23 Claims, 11 Drawing Sheets

(58) Field of Classification Search
CPC ............... G06K 9/66; G06K 2209/051; G06K 9/00288; G06K 9/00926; G06K 9/2054; G06K 9/6215; G06K 9/6257; G06K 9/6267; G06K 2009/00644; G06K 2009/6864; G06K 2209/21; G06K 9/0014; G06K 9/00147; G06K 9/00201; G06K 9/00208
USPC ........................................................ 382/159
See application file for complete search history.

(56) References Cited

U.S. PATENT DOCUMENTS

| | | |
|---|---|---|
| 2017/0308789 A1 | 10/2017 | Langford et al. |
| 2019/0034763 A1 | 1/2019 | Guim Bernat et al. |
| 2019/0138906 A1 | 5/2019 | Cakmak et al. |
| 2020/0258223 A1* | 8/2020 | Yip .......................... G06T 7/11 |
| 2020/0401344 A1* | 12/2020 | Bazarsky .................. G06T 3/20 |
| 2021/0027206 A1* | 1/2021 | Monaghan ............... G06N 5/02 |

OTHER PUBLICATIONS

NVM Express; "NVM Express Base Specification Revision 1.4", Jun. 10, 2019, 403 pages <http://nvmexpress.org>.

Jiang, et al.; "Training Sample Selection for Deep Learning of Distributed Data", 2017 IEEE International Conference on Image Processing (ICIP), Sep. 2017, pp. 2189-2193 <https://ieeexplore.ieee.org/document/8296670>.

\* cited by examiner

TRAINING DATA SAMPLE SELECTION FOR USE WITH NON-VOLATILE MEMORY AND MACHINE LEARNING PROCESSOR

FIELD

The disclosure relates, in some embodiments, to non-volatile memory (NVM) arrays and to data storage controllers for use therewith. More specifically, but not exclusively, the disclosure relates to methods and apparatus for implementing training data sample selection within a data storage controller of an NVM array for use with a machine learning processor.

INTRODUCTION

Deep learning (which also may be referred to as deep structured learning or hierarchical learning) relates to machine learning methods based on learning data representations or architectures, such as deep neural networks (DNNs), rather than to task-specific procedures or algorithms. Deep learning is applied to such fields as speech recognition, computer vision, and self-driving vehicles. Deep learning may be accomplished by, or facilitated by, deep learning accelerators (DLAs), e.g., microprocessor devices designed to accelerate the generation of useful neural networks to implement deep learning. DNNs and other neural networks may require training using large sets of training data.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a data storage device that includes: a non-volatile memory (NVM) array; a data processor configured to obtain machine learning training data from the NVM array, determine training scores for a plurality of portions of the training data obtained from the NVM array, select a particular portion of the training data from the NVM array based, at least in part, on the training scores, and output the selected portion of the training data to a machine learning processor.

Another embodiment of the disclosure provides a method for machine learning using data storage device including an NVM array, the method including: obtaining machine learning training data from the NVM array; determining training scores for sets of the training data obtained from the NVM; selecting a particular set of training data from the NVM array based, at least in part, on the training scores; and transferring the selected set of training data to a machine learning processor for training a neural network.

Yet another embodiment of the disclosure provides an apparatus for use with a data storage device where the apparatus includes: means for obtaining machine learning training data from an NVM array; means for determining training scores for a plurality of portions of the training data obtained from the NVM; means for selecting a particular portion of the training data from the NVM array based, at least in part, on the training scores; and means for outputting the selected portion of the training data to a machine learning processor for training a neural network.

DETAILED DESCRIPTION

Figure 1:
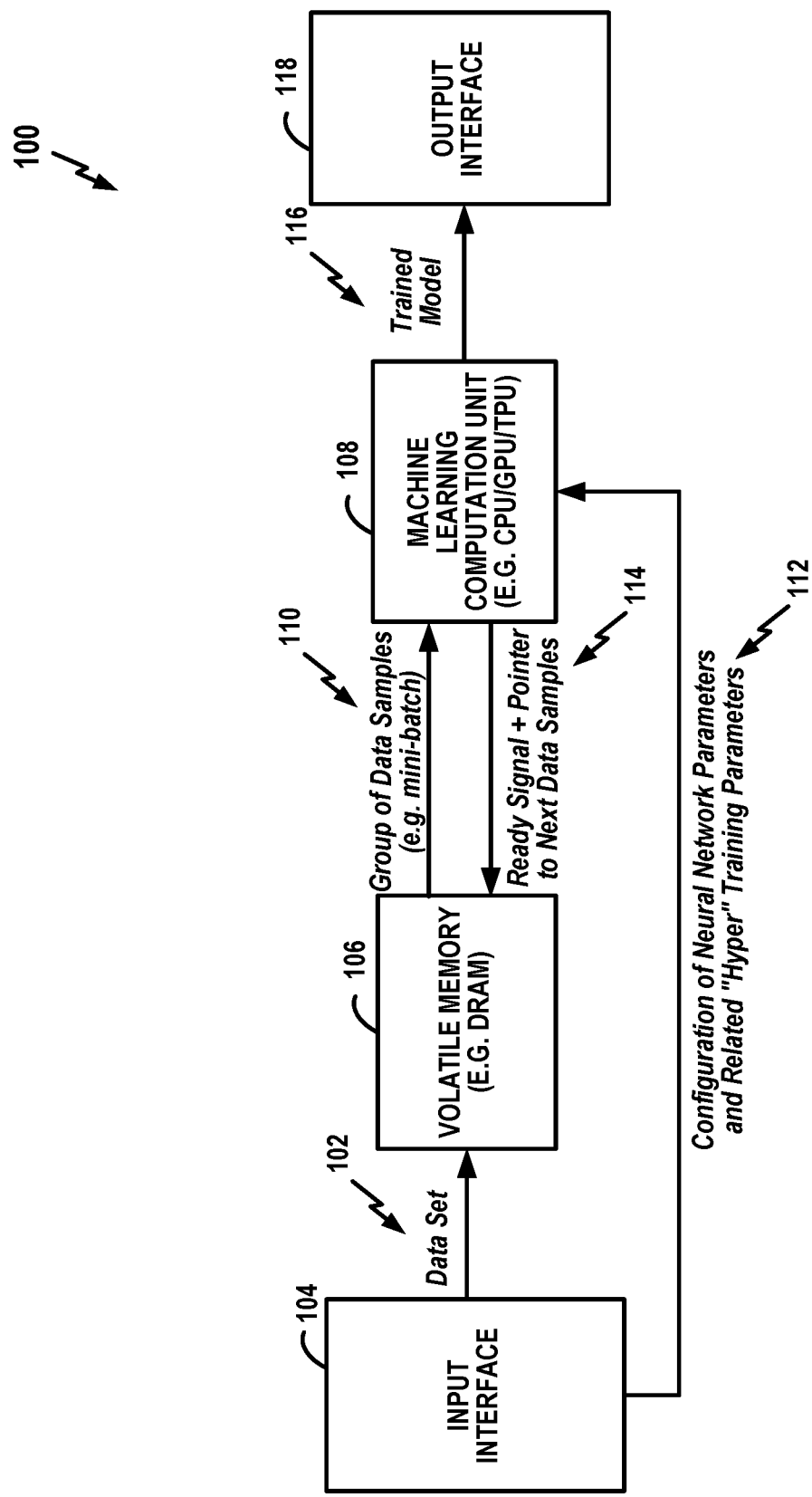
FIG. 1 is a schematic block diagram illustrating an exemplary system for training a machine learning model, such as a DNN, wherein training data is stored in a volatile memory that is accessed by a machine learning computation unit.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to non-volatile memory (NVM) arrays and to data storage devices or apparatus for controlling the NVM arrays, such as a controller of a data storage device (DSD), e.g. a solid state device (SSD), and in particular to solid-state memory storage devices such as those that use NAND flash memory (herein "NANDs"). (A NAND is a type of non-volatile storage technology that does not require power to retain data. It exploits negative-AND, i.e. NAND, logic.) For the sake of brevity, an SSD having one or more NAND dies will be used as a non-limiting example of a DSD below in the description of various embodiments. It is understood that at least some aspects described herein may be applicable to other forms of data storage devices as well. For example, at least some aspects described herein may be applicable to a data storage or memory device including phase-change memory (PCM) arrays, magneto-resistive random access memory (MRAM) arrays, and resistive random access memory (ReRAM) arrays. In addition, the various embodiments may be used in various machine learning devices which may include some combination of processing elements and memory/data storage elements, including the NVM arrays constructed and/or configured in accordance with the described embodiments.

As noted above, deep learning may be accomplished by, or facilitated by, deep learning accelerators (DLAs), e.g., microprocessor devices designed to accelerate the generation of deep neural networks (DNNs) to implement deep learning. These networks may also be referred to as learning networks. In some examples, large amounts of machine learning training data are stored within a volatile memory, such as a dynamic random access memory (DRAM), for use by a deep learning machine learning processor, such as a central processing unit (CPU), graphics processing unit (GPU) or a tensor processing unit (TPU). The deep learning processor trains the DNN by repeatedly and iteratively obtaining training data from the volatile memory at very high rates and then processing the training data over various epochs. (The term epoch is discussed and defined below.) For example, many groups of data samples may be randomly (or uniformly) selected from a very large data set for processing by the deep learning processor (a method that may be referred to as "shuffling"). Alternatively, the selection of data samples (grouped into a "mini-batch") may take into account an imbalance in data set labels (a method that may be referred to as "importance sampling" or "over/under sampling"). The selected samples are processed in one or more forward and backward passes through a neural network using a machine learning training procedure to train the DNN, such as to train an image recognition system to recognize faces.

These approaches typically require very high bandwidth between the memory where the training data is stored and the machine learning processor (e.g. the CPU/GPU/TPU). That is, these are "greedy" approaches that as a practical matter may need ultra-fast volatile memories (such as DRAM), which can be expensive and can consume large amounts of power. Hence these approaches are not well-suited for practical applications that require low power and/or low cost, such as machine learning within Internet-of-Things (IoT) devices. Such approaches are thus not well-suited for use with devices where training data is stored in an NVM array, such as within a low cost flash NAND device.

FIG. 1 illustrates such a "greedy" machine learning system 100. A large training data set 102 is obtained via an input interface 104 (from a source of training data, not shown) and loaded into a high speed volatile memory 106 (such as a DRAM). A machine learning computation unit 108 repeatedly retrieves groups of data samples 110 (such as mini-batches) for processing in accordance with network configuration parameters and related training related parameters (e.g. hyper parameters) 112. Whenever the computation unit 108 needs a new group of data samples 110, the computation unit 108 sends a signal 114 (such as a "ready" signal with a pointer to the next set of data samples) to the volatile memory 106 and the next group of data samples 110 is then sent to the computation unit 108. The transmission of the configuration parameters 112 may be a one-time transmission. However, retrieval and transmission of the groups of data samples 110 is typically repeated numerous times at high frequency, hence the practical need for a high speed DRAM or other high speed volatile memory 106. Eventually, upon completion of the training, parameters defining the trained model 116 (the DNN) are output via an output interface 118 for use by a host device or other suitable device. Such parameters may include DNN synaptic weights and the like.

Herein, methods and apparatus are disclosed for implementing data sample selection within the hardware or firmware of a data storage controller of an NVM array using, for example, a data sample selector (DSS) or "data sample selection unit" configured to intelligently select training data samples (in a non-greedy manner) from the NVM array for forwarding to an external machine learning processor (e.g. the CPU/GPU/TPU). The machine learning processor performs DNN training by, e.g., performing various forward passes through its neural network with back propagation. By exploiting a data sample selection unit in the data storage controller, the amount of data that needs to be transferred from memory (in this case the NVM array) to the machine learning processor is much smaller than with the greedy approaches discussed above that require high speed volatile memory. That is, in some examples, the data sample selection unit provides for internal screening of DNN training data within a memory device to limit the amount of data that needs to be obtained from the NVM array and sent to the external machine learning processor. In this manner, a relatively low cost and low power NVM array may be used to store training data and a relatively low bandwidth connection may be employed between the data storage controller and the machine learning processor, without significant degradation of the efficacy of the training procedure.

Overview

Figure 2:
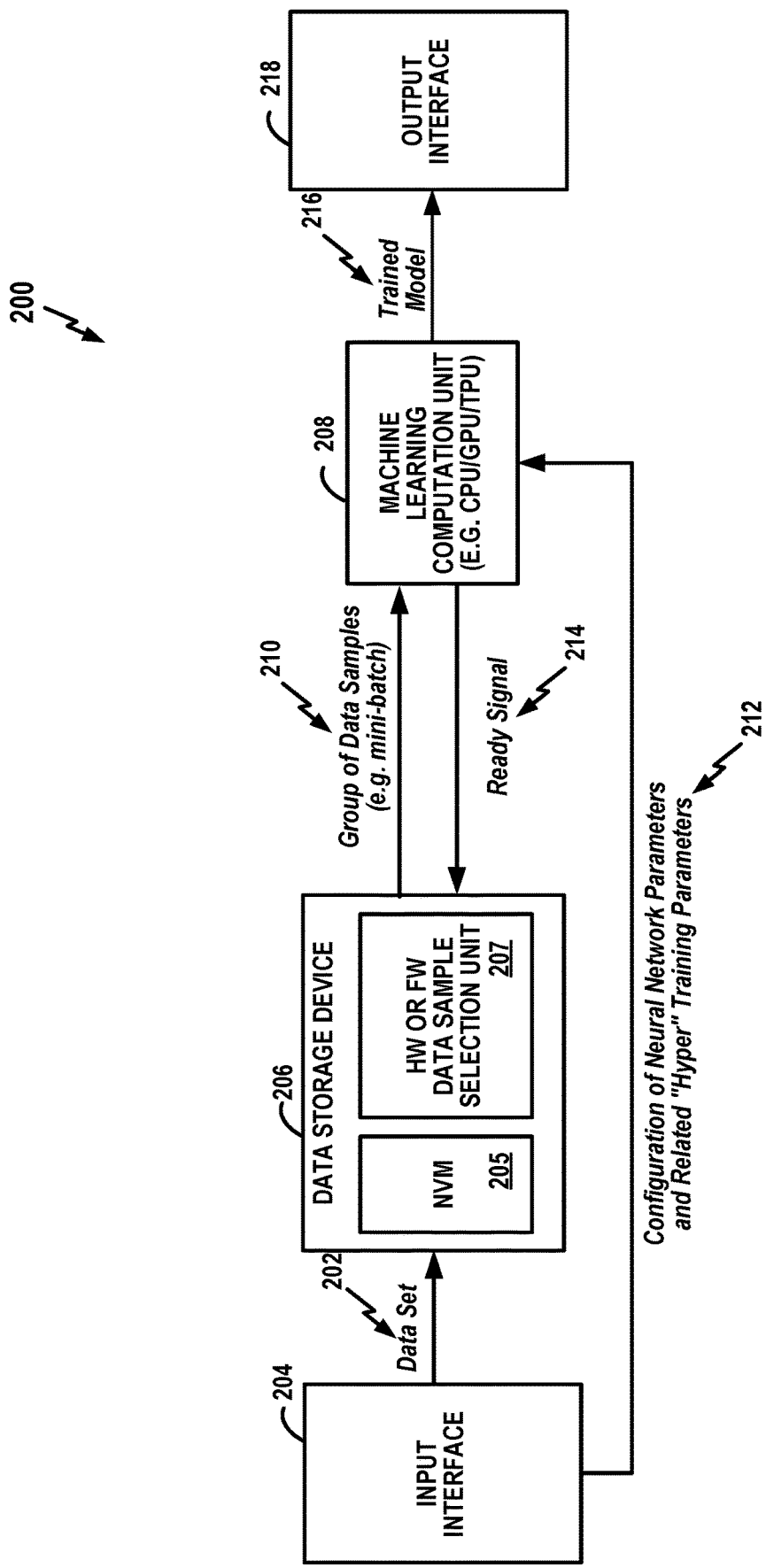
FIG. 2 is a schematic block diagram illustrating an exemplary system for training a machine learning model, wherein training data is stored in an NVM array that is accessed by a hardware or firmware data sample selection unit of a data storage device, which then selectively provides training data to an external machine learning computation unit.

FIG. 2 illustrates a deep learning system 200 that stores training data in an NVM and includes a hardware (HW) or firmware (FW)-based data sample selection unit within a DSD that includes the NVM. A large training data set 202 is obtained via an input interface 204 (from a source of training data, not shown) and loaded into an NVM 205 of a DSD 206. (In some examples, the training data set 202 is updated dynamically.) The DSD 206 also includes a data sample selection unit 207 (or data sample selector), which may, e.g., be a component of a data storage controller (not shown in FIG. 2) of the DSD 206. A machine learning computation unit 208 uses groups of data samples 210 (such as mini-batches) for processing in accordance with network configuration parameters and related training related parameters 212. The transmission of the configuration parameters 212 may be a one-time transmission.

The groups of data samples 210 are obtained from the data sample selection unit 207 rather than from a DRAM as in FIG. 1. The data sample selection unit 207 intelligently selects suitable groups of data (e.g. mini-batches) from the NVM 205. By intelligently selecting groups of data for processing, the data sample selection unit 207 can greatly reduce the number of times the computation unit 208 needs to request training data while still providing satisfactory training. Hence, although retrieval of data from the NVM 205 is slower than retrieval of data from a DRAM (as in FIG. 1), the overall processing time for training is not significantly affected, while benefiting from the use of far less expensive and far less power hungry NVMs.

By "intelligently" selecting samples, it is meant that the data sample selection unit 207 selects samples that provide some degree of optimization relative to whatever selection procedure would otherwise be used by the computation unit 208. Such computation units often select data randomly or uniformly. As will be explained below, in some aspects, the data sample selection unit may calculate a relative "training value" for a sub-set of data samples from an entire set of data samples in the NVM, where "value" refers to the relative worth (worthiness), utility (usefulness), importance or efficacy of the data samples to the DNN training. The training value may be generated as a score or a metric that represents the relative value of the data to the DNN training model used by the machine learning computation unit 208.

In the system of FIG. 2, whenever the machine learning computation unit 208 needs a new group of data samples 210, the computation unit 208 sends a signal 214 (such as a "ready" signal) to the DSD 206, which is processed by the data sample selection unit 207. Note that the ready signal need not specify a pointer to a next set of data, since the data sample selection unit 207 will select the group of data and send any pointers (if needed) to the NVM 205. Eventually, upon completion of the training, parameters defining the trained model 216 (the DNN) are output via an output interface 218 for use by a host device or other suitable device.

Figure 3:
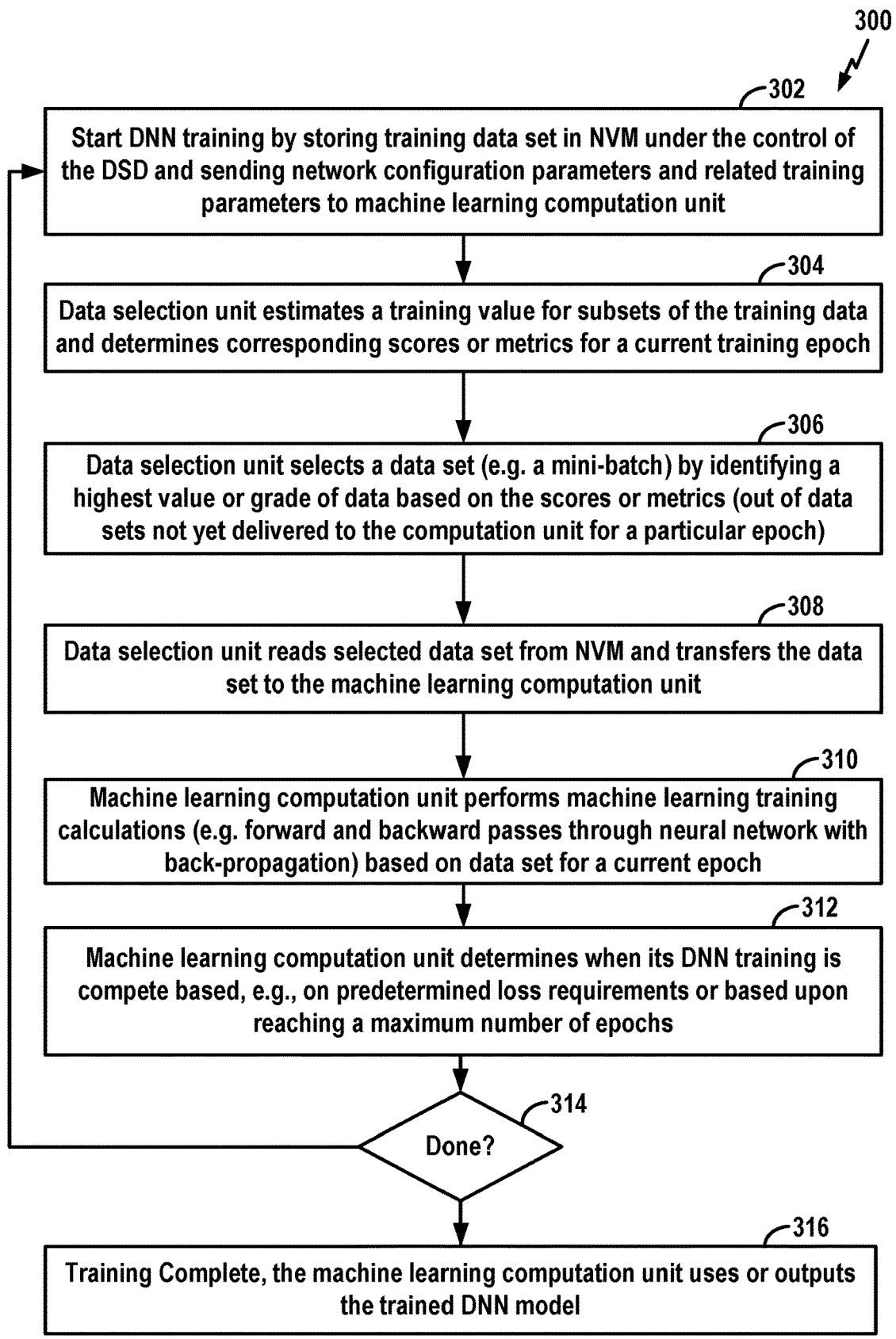
FIG. 3 is a flow chart illustrating exemplary operations performed by a data sample selection unit of a data storage device coupled to an NVM array that stores training data.

FIG. 3 summarizes a procedure 300 for training a DNN using the system of FIG. 2. DNN training begins at 302 during which time the aforementioned network configuration parameters and related training related parameters may be sent by the DSD to the machine learning computation unit and training data may be loaded into the NVM (if not already done so). At 304, an estimated training value is calculated, computed or determined by the data sample selection unit for a current training epoch based on training data obtained from the NVM, where the training value is representative of the value or usefulness of the data to the training procedure, as already explained. The data sample selection unit may calculate a training value or grade for a large chunk or portion or subset of data samples obtained from the entire set of training data samples in the NVM. The training value or grade may be generated as a score or a metric that represents the value of the data to the DNN training model based, for example, on correctness values and confidence values. (Selection may include choosing data samples that may have been misclassified by a current neural network model and therefore are more valuable than other samples and also by selecting training samples which are correctly classified but have a borderline probability grade produced by the DNN.)

Insofar as terminology is concerned, in neural networks that employ forward and backward passes during training, an "epoch" represents one forward pass and one backward pass of all the training examples. Hence, an epoch describes the number of times a training algorithm or procedure "sees" the entire training data set. Thus, each time the training procedure has seen or processed all samples in the dataset, an epoch has completed. An iteration describes the number of times a batch of data passes through the training procedure. Hence, every time a batch of data is passed through the neural network, an iteration is completed. For systems or procedures that do not necessarily use backward and forward passes, the term epoch may refer to analogous aspects of the training procedure. Hence, the term epoch is not limited to backward and forward passes and, in some examples, the term may generally represent a corresponding stage of a training procedure. In some examples, by using the data sample selection procedures described herein, fewer epochs may be needed to train the neural network.

Selection may additionally or alternatively be based on one or more of cross-entropy determinations (based, e.g., on a loss function used during training of the DNN), classical entropy determinations (based on a measure of randomness), a Gini-Simpson index (related to a measure of a degree of concentration across different classes of data values), and a Max-Likelihood (derived, e.g., from probability of a most likely class). These and other data selection techniques are described, e.g., in Jiang et al., "Training sample selection for deep learning of distributed data," 2017 IEEE International Conference on Image Processing (ICIP), Beijing, 2017, pp. 2189-2193). Generally speaking, though, the selection of data by the data sample selection unit may use any system, method, procedure, algorithm, etc., that provides some degree of optimization or improvement or benefit relative to whatever selection procedure would otherwise be used by the machine learning computation unit. Often, machine learning computation units just select data randomly.

At 306, the data sample selection unit selects the highest grade data samples (e.g. a mini-batch for the particular training epoch) estimated at 304, which have not already been delivered to the machine learning computation unit. For example, the data sample selection unit may select the set of data samples that have the highest score or highest metric (representative of the value of the data to the DNN training model). During the first pass through the stages of FIG. 3 (or the first "epoch"), no data samples have yet been delivered to the machine learning computation unit, and so the highest grade data samples are selected at 306. During a subsequent pass through the stages of FIG. 3 (or a second epoch), a next highest grade of data is selected, and so on for additional epochs. At 308, the data sample selection unit transfers the selected data samples from the NVM to the machine learning computation unit. At 310, the external machine learning computation unit performs DNN training calculations by, for example, performing various forward and backward passes through its neural networks (while using back propagation) to generate a set of synaptic weights for the DNN (in accordance with known DNN training techniques).

At 312, the computation unit determines whether it has completed its DNN training based, for example, on any predetermined loss requirements or based upon reaching a maximum number of epochs, etc. (Loss requirements relate to loss functions, which may be used to optimize parameter values in a neural network model. Generally speaking, loss functions map a set of parameter values for a network to scalar values that indicate how effective the parameters are at accomplishing a particular task the network is designed to perform.) Assuming training is not yet complete, processing returns via decision block 314 to block 304, where the data sample selection unit calculates more estimated training values so that the remaining highest grade data (not previously sent) can be selected and sent to the machine learning computation unit. The overall procedure of FIG. 3 is repeated until training is deemed complete by the machine learning computation unit at 312. The trained DNN may then be output or used at 316.

Note that, within FIG. 3, blocks 304, 306 and 308 are performed by a memory device (such as by components of an SSD), whereas the DNN calculations (e.g. forward pass with backpropagation) are performed by an external DNN machine learning computation unit. This differs from systems discussed above in connection with FIG. 1 in which an external DNN computation unit performs the selection of data and may demand frequent and high-speed retrieval of many batches (or min-batches) of data (hence, typically requiring relatively fast and expensive high-speed volatile memory, such as DRAM). With the method of FIG. 3, the selection of data sets (such as mini-batches) is performed by components of the memory device (e.g. by a data sample selection unit of a controller of an SSD), thus allowing for the practical use of NVM since the memory device can control the amount of data to be retrieved from the NVM to limit the amount of data that needs to be sent to the external DNN computation unit.

In this manner, training data selection capabilities may be provided at the memory controller level of a memory device to enable usage of NAND flash memories for DNN training implementations. To briefly summarize, during a training procedure of a DNN model, a data set is stored in an NVM memory or other relatively inexpensive memory. The memory device may include a memory and a controller that incorporates a compute engine (which may be called a data sample selector unit). At each stage of DNN training, a limited number of data samples (chosen from the above-mentioned data set) are selected and delivered from the memory-unit to the external computation unit (e.g. CPU/GPU etc.). The computation unit processes the delivered data (for example, as a "Forward Pass" of the DNN training procedure).

In some examples, when a processing stage or epoch is complete, the machine learning computation unit sends to the data sample selector unit a DONE flag and a DO_SELECT flag. If DO_SELCT=1, the data sample selector unit computes a training value score for each of the data samples (usually from a certain part of the data set) stored in the NVM. The score represents the estimated value of each of these data samples to the training procedure. The data sample selector unit indicates or identifies the samples with the highest score and initiates a transfer of the selected data samples to the external DNN compute unit. If DO_SELECT=0, the score calculated in the previous stages is used for the selection operation (i.e. the data samples with following scores are transferred to the compute unit). Note that the selection operation is independent of the DONE indication, such that the selection-compute operation performed by the data sample selection unit is not necessarily performed at each step.

Detailed Examples And Alternative Implementations

Figure 4:
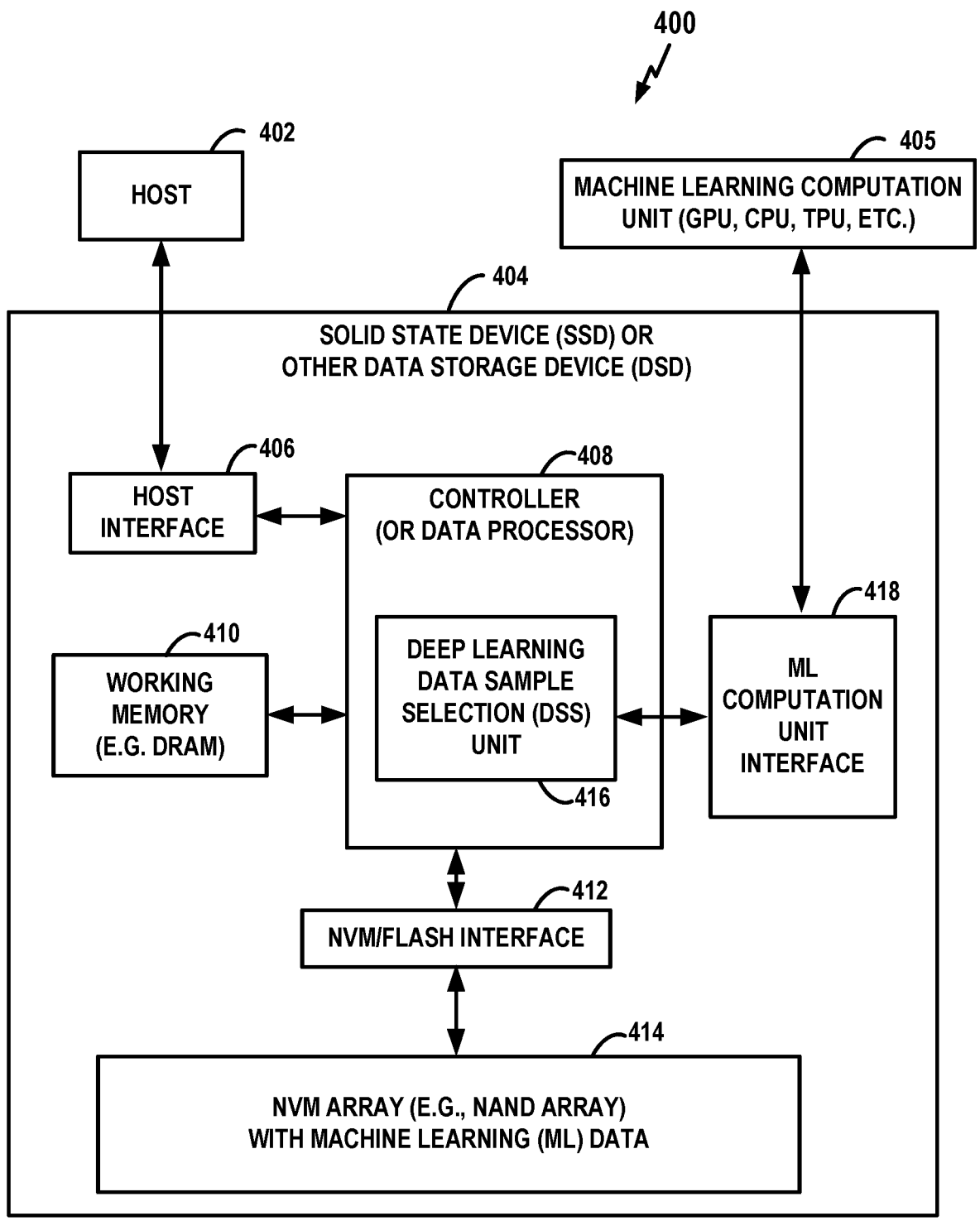
FIG. 4 is a schematic block diagram illustrating an exemplary data storage system with a data storage controller and an NVM array, where the data storage controller is configured to select training data for forwarding to an external machine learning computation unit.

FIG. 4 is a block diagram of a system 400 including an exemplary SSD or DSD having a deep learning data sample selection unit. The system 400 includes a host 402 and a SSD 404 (or other DSD, but for simplicity referred to as SSD below) coupled to the host 402. The system 400 also includes a machine learning computation unit 405, which, in this example, is external to the SSD 404 and separate from the host 402, but in other examples the machine learning computation unit 405 may be a component of the SSD 404 or a component of the host 402. The machine learning computation unit 405 may be, for example, a CPU, GPU or TPU, or combination thereof.

The host 402 provides commands to the SSD 404 for transferring data between the host 402 and the SSD 404. For example, the host 402 may provide a write command to the SSD 404 for writing data to the SSD 404 or read command to the SSD 404 for reading data from the SSD 404. In illustrative examples, the write commands are provided to write initial machine learning training data to the NVM array 414 for subsequent processing by the machine learning computation unit 405 as part of a training process to train a DNN. The read commands may be used to read the resulting parameters representative of the trained DNN once training is complete. The host 402, however, may be any system or device having a need for data storage or retrieval and equipped with a compatible interface for communicating with the SSD 404. For example, the host 402 may a computing device, a personal computer, a portable computer, a workstation, a server, a personal digital assistant, a digital camera, or a digital phone as merely a few examples. Additionally or alternatively, the host 402 may be a system or device having a need for neural network processing, such as speech recognition, computer vision, and self-driving vehicles. For example, the host 402 may be a component of a self-driving system of a vehicle or a component of an IoT device.

The SSD 404 includes a host interface 406, a controller 408 (which may be referred to herein as a processor, data processor or processing circuit or other suitable terms), a working memory 410 (such as DRAM or other volatile memory), an NVM interface 412 (which may be referred to as a flash interface), and an NVM array 414, such as an array of one or more NAND dies. In illustrative DNN training examples, the volatile memory 410 is not used to store any significant amount of machine learning training data, which is instead stored in the NVM array 414 and, hence, the volatile memory 410 may be a relatively small and inexpensive DRAM for temporarily storing other data needed by the SSD, such as for temporarily storing incoming read and write commands.

The host interface 406 is coupled to the controller 408 and facilitates communication between the host 402 and the controller 408. The controller 408 is coupled to the volatile memory 410 as well as to the NVM array 414 via the NVM interface 412. The host interface 406 may be any suitable communication interface, such as a Non-Volatile Memory Express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 402 includes the SSD 404. In other embodiments, the SSD 404 is remote from the host 402 or is contained in a remote computing system communicatively coupled with the host 402. For example, the host 402 may communicate with the SSD 404 through a wireless communication link. The host interface may correspond to both the input interface and output interface of FIG. 2.

The controller 408 controls operation of the SSD 404. In various aspects, the controller 408 receives commands from the host 402 through the host interface 406 and performs the commands to transfer data between the host 402 and the NVM 414. Furthermore, the controller 408 may manage reading from and writing to memory 410 for performing the various functions effected by the controller and to maintain and manage cached information stored in memory 410. Still further, the controller includes a deep learning data sample selection unit 416 (or data sample selector) that selects (for example, using an intelligent selection procedure) particular sets of machine learning data for forwarding to the machine learning computation unit 405 so that the machine learning computation unit 405 need not directly access the NVM array 414 for data nor rely on the volatile memory 410 for storing large quantities of training data.

In this example, a machine learning computation unit interface 418 is provided between the deep learning data sample selection unit 416 and the machine learning computation unit 405. The machine learning computation unit interface 418 may be a relatively low bandwidth interface because relatively small amounts of data will be transferred from the deep learning data sample selection unit 416 and the machine learning computation unit 405 (as compared to systems that lack a data sample selection unit 416). In some examples, the host interface 406 uses a Peripheral Component Interconnect (PCI) Express layer, whereas the machine learning computation unit interface 418 does not use the PCIe layer and hence does not burden the PCIe layer. In some examples, direct memory access (DMA) components are used to expedite transference of data to an external machine learning computation unit.

The controller 408 may generally include any type of processing device, such as a microprocessor, a microcontroller, an embedded controller, a logic circuit, software, firmware, or the like, for controlling operation of the SSD 404. In some aspects, some or all of the functions described herein as being performed by the controller 408 may instead be performed by another element of the SSD 404. For example, the SSD 404 may include a microprocessor, a microcontroller, an embedded controller, a logic circuit, software, firmware, or any kind of processing device, for performing one or more of the functions described herein as being performed by the controller 408. According to other aspects, one or more of the functions described herein as being performed by the controller 408 are instead performed by the host 402. In still further aspects, some or all of the functions described herein as being performed by the controller 408 may instead be performed by another element such as a controller in a hybrid drive including both non-volatile memory elements and magnetic storage elements.

The working memory 410 may be any suitable memory, computing device, or system capable of storing data. For example, the memory 410 may be ordinary RAM, DRAM, double data rate (DDR) RAM (DDRAM), static RAM (SRAM), synchronous dynamic RAM (SDRAM), a flash storage, an erasable programmable read-only-memory (EPROM), an electrically erasable programmable ROM (EEPROM), or the like. In various embodiments, the controller 408 uses the working memory 410, or a portion thereof, to store data during the transfer of data between the host 402 and the NVM array 414. For example, the memory 410 or a portion of the memory 410 may be a cache memory. The NVM array 414 receives data from the controller 408 via the NVM interface 412 and stores the data. The NVM array 414 may be any suitable type of NVM, such as a NAND-type flash memory or the like. In the illustrative example, the NVM array 414 primarily stores large amounts of machine learning training data may be generally store any type of data or information.

Although FIG. 4 shows an example SSD and an SSD is generally used as an illustrative example in the description throughout, the various disclosed embodiments are not necessarily limited to an SSD application/implementation. Other DSD examples were noted above. As an example, the disclosed NVM array and associated processing components can be implemented as part of a package that includes other processing circuitry and/or components. For example, a processor may include, or otherwise be coupled with, embedded NVM and associated circuitry and/or components for deep learning that are described herein. The processor could, as one example, off-load certain deep learning tasks to the NVM and associated circuitry and/or components. As another example, the controller 408 may be a controller in another type of device and still include the selection unit 416 and perform some or all of the functions described herein. In one or more embodiments, the controller 408 is also tasked with performing data storage and data management functions, such as performing various read and write operations in response to commands from the host 402.

Figure 5:
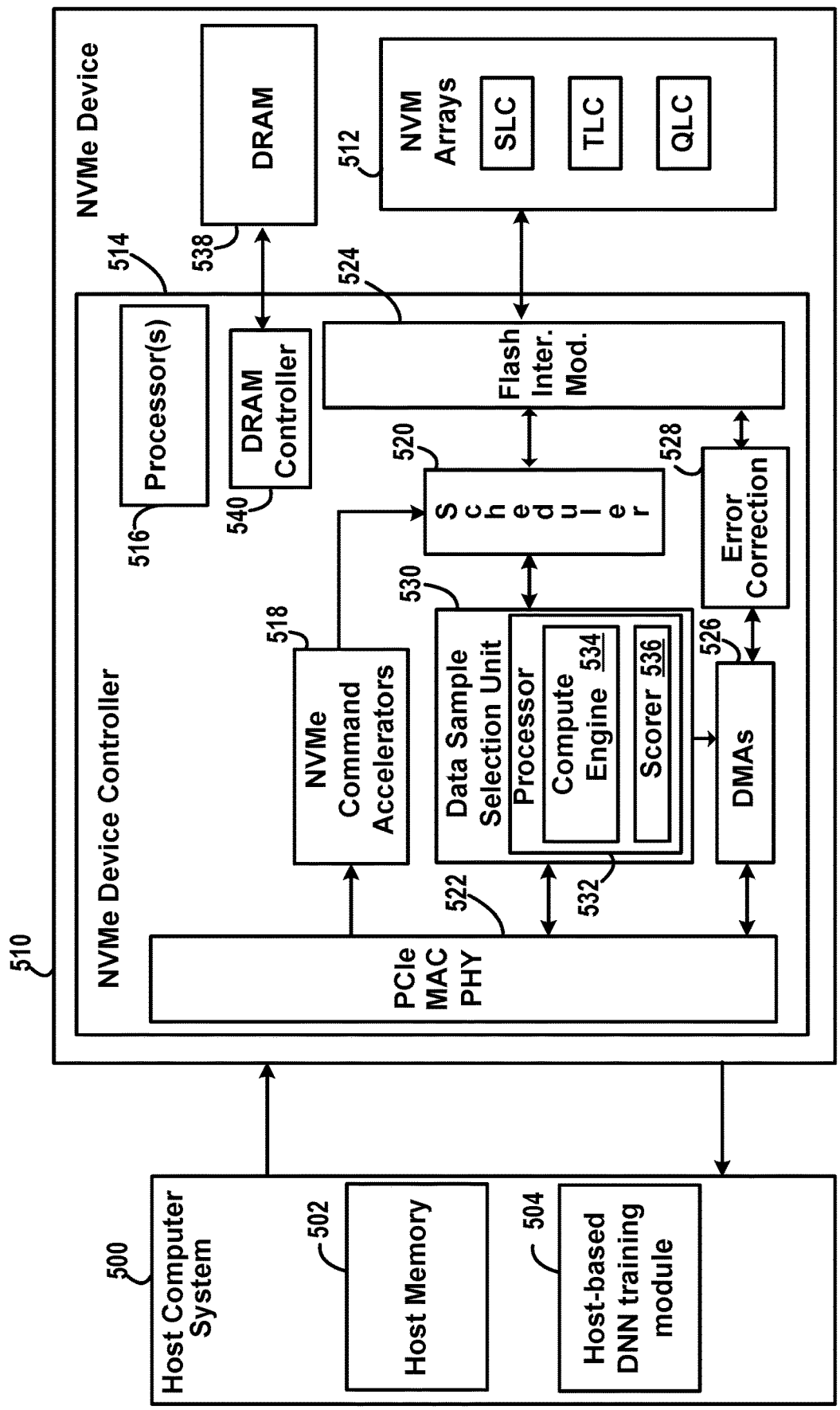
FIG. 5 illustrates a data storage system equipped for use with NVM express (NVMe), where a data storage controller is configured to select training data for forwarding to an external machine learning computation system or module within a host device.

FIG. 5 illustrates details of an exemplary system where the SSD controller is configured in accordance with NVM express (NVMe). NVMe provides a scalable host controller interface for systems that utilize PCIe-based solid state drives. See, for example, the NVM Express standard, Revision 1.4, Jun. 10, 2019.

In FIG. 5, a host computer system 500 includes host memory 502 and a host-based DNN training module 504. That is, in this example, the external machine learning computation unit of FIG. 4 is a component of the host system 500 rather than a separate external component. An NVMe device 510 is provided with machine learning data sample selection components. The NVMe device 510 includes NVM arrays 512 for storing DNN or other machine learning training data and an NVMe device controller 514. The NVM arrays, as shown, may include single-level cell (SLC) arrays, triple-level cell (TLC) arrays, and quad-level cell (QLC) arrays. The NVMe controller 514 includes one or more processors 516 responsible for execution of frond-end and back-end tasks. One or more NVMe accelerators 518 route commands (such as read and write commands) received from the host system 500 via a PCIe MAC PHY interface 522 to a scheduler 520. The scheduler is responsible for controlling data transfer while activating a control path for posting completion and interrupts and activating DMAs for data transfer between host and device. Data may be retrieved from the NVM arrays 512 using a flash interface module 524 (which interacts with the memory arrays mainly for read and write operations), then delivered to the host device using one or more DMAs 526 following error correction 528.

Insofar as data sample selection is concerned, a data sample selection unit 530 is provided. The data sample selection unit 530 may be configured and controlled by the host using vendor specific commands or via direct access. The data sample selection unit 530 incorporates an embedded processor 532 that activates or includes HW or FW components. Portions of the processor 532 are configured as a compute engine 534 and a scorer 536. The compute engine 534 computes the above-described training values, scores, metrics or grades (representative of the efficacy of particular data sets in the training of a DNN model). The scorer 536 analyzes the scores for the data sets and selects the highest scoring set that has not yet been delivered to the external DNN training processor 504 (which in this example is part of the host). The compute engine 534 is thus responsible for implementing complex compute operations for data sample selection and the scorer 536 is responsible for grading the samples. The selected samples are transferred to the host 500 through the DMA 526.

Additional components of the NVMe controller 514 shown in FIG. 5 include a DRAM 538 and a DRAM controller 540. DNN or machine learning training data is primarily or exclusively stored in the NVM arrays. The DRAM may be used for storing other data that may be needed during the operation of the NVMe device controller 514. Note that, in an exemplary implementation, the main components modified relative to conventional NVMe are the processors (modified to account for the data sample selection unit 530) and the addition of the data sample selection unit 530 itself. That is, only minor or minimal changes are made to otherwise standard NVMe systems to implement the DNN data sample selection.

Figure 6:
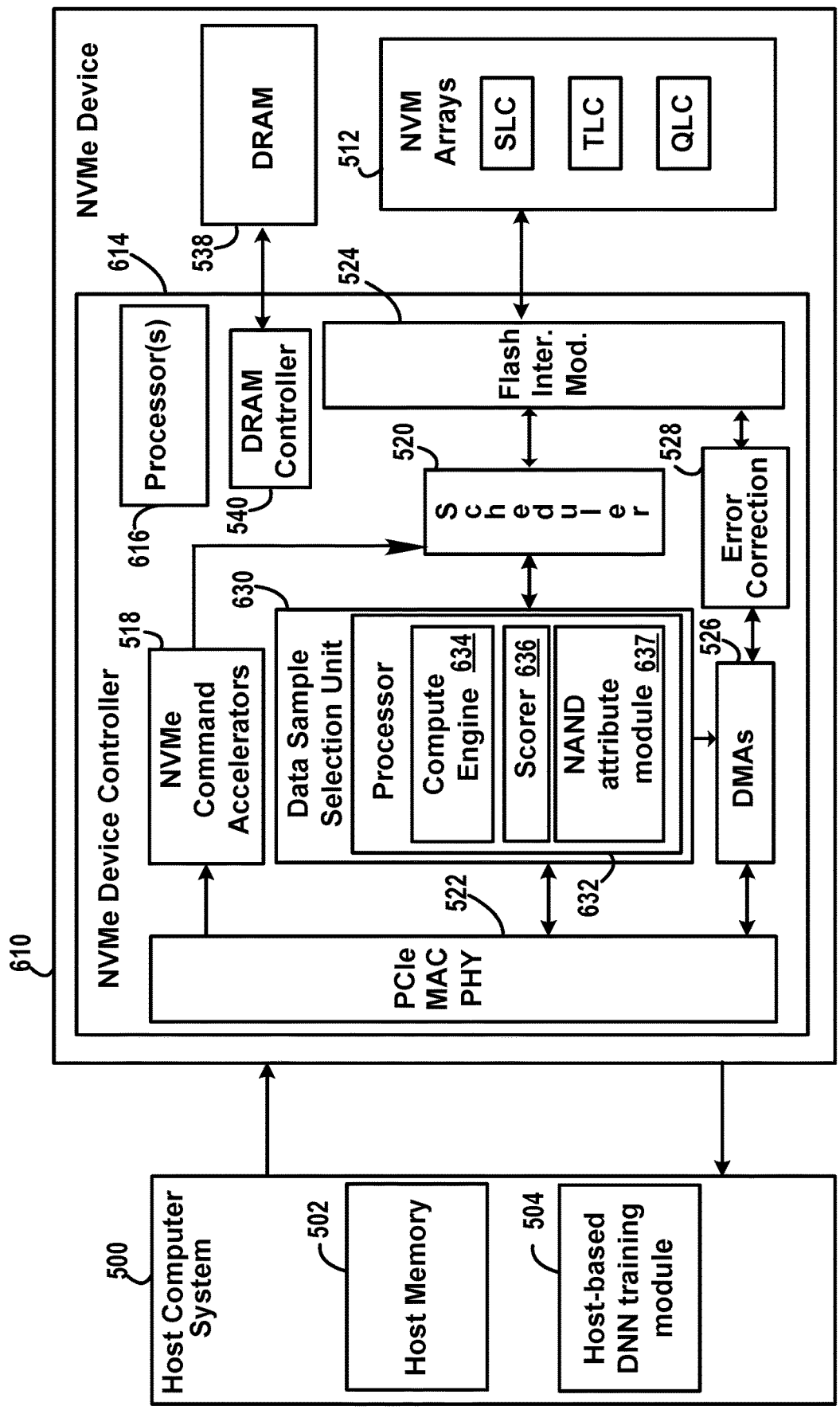
FIG. 6 illustrates a data storage system equipped for use with NVM express (NVMe), where a data storage controller is configured to select training data based on one or more NAND storage attributes, such as the physical location of the data in a NAND array.

FIG. 6 illustrates details of an exemplary system where the data sample selection unit of the SSD exploits one of more of 1) information about the physical location of the data samples, such as by prioritizing samples that are physically adjacent (e.g. in the same physical block of the NVM array) to allow a faster read operation, and 2) refresh information, such as by prioritizing samples that belong to physical blocks that have gone through a refresh operation. A refresh operation involves, e.g., updating read thresholds for blocks or data and/or copying valid data that satisfies a predefined threshold criteria to another NVM block and then invalidating data that does not satisfy the criteria. The threshold criteria may involve comparing a read disturb count to a threshold count. Following a refresh, ECC operation during a next read will likely be much faster and with lower power consumption, thus reducing power consumption during reads within the NVMe device 610. Many of the components of the NVMe device controller 614 of FIG. 6 may be the same as those of FIG. 5 and hence the same reference numerals are used. Components that may differ (or which include at least some sub-components that may differ) are assigned new reference numerals, including the NVMe device 610, the NVMe device controller 614, the processor(s) 616, the data sample selection unit 630, the compute engine 634, the scorer 636, and the added NAND attribute module 637.

The NAND attribute module 637 of FIG. 6 is configured to detect any correlation among the chosen samples related to NAND attributes. In one aspect, the NAND attribute module 637 uses information about the physical location of the chosen samples and prioritizes samples (e.g. by assigning them higher scores) that are physically adjacent so as to boost the read performance. In another aspect, data samples belonging to physical blocks that have gone through a refresh operation are assigned higher priority (e.g. given a higher score). In a third aspect, the device controller 614 (or its subcomponents) store chosen samples adjacent to one another in the NVM arrays 512 in order to achieve better performance in a next set of operations (such as during a next epoch). For example, the processor 632 of the data sample selection unit 630 may send signals or information to the processor(s) 616 identifying chosen data samples so that the processor(s) 616 can control the flash interface module 524 to store those samples together (or adjacent) within the NVM arrays 512 to achieve better read performance.

Figure 7:
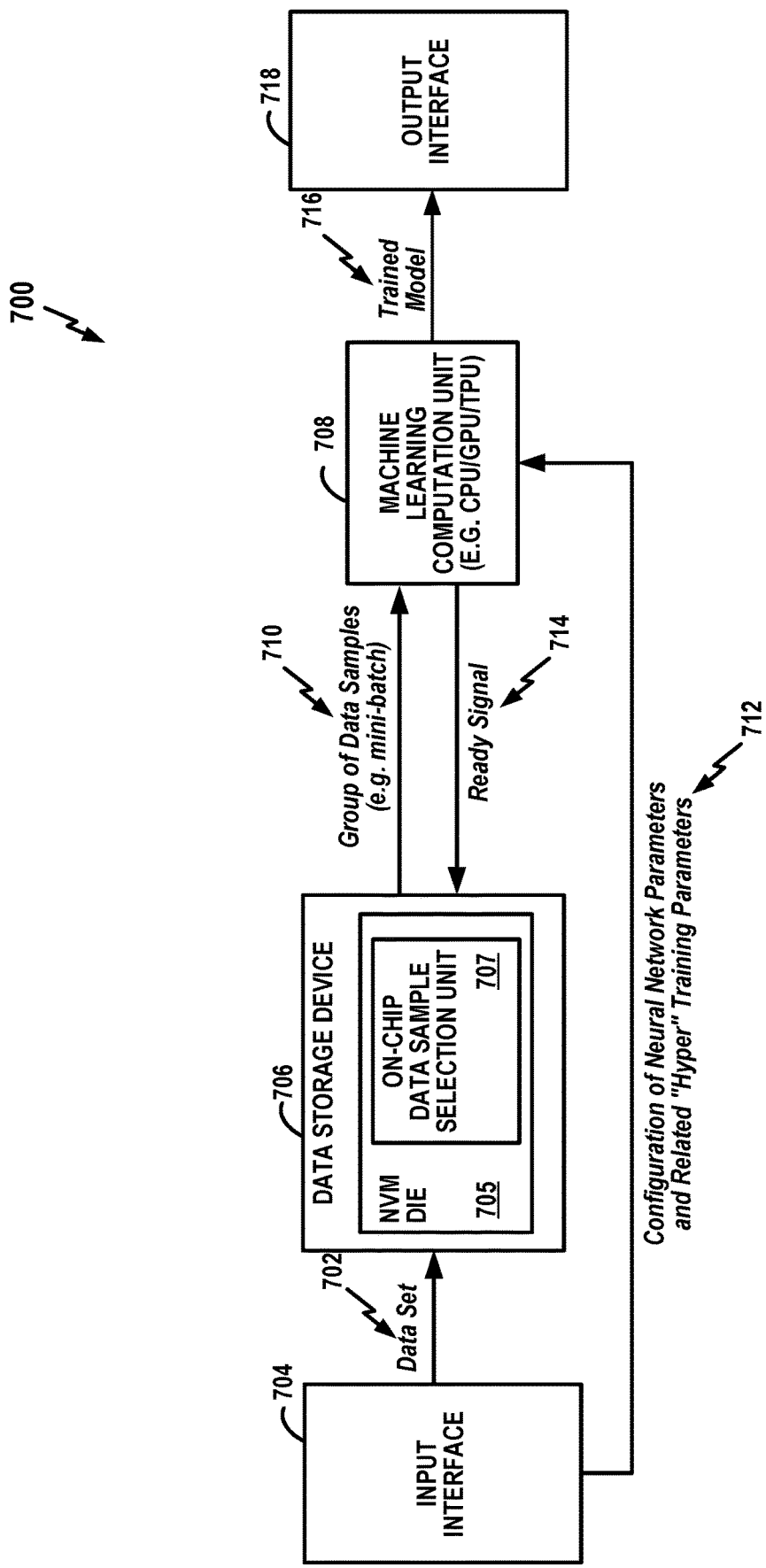
FIG. 7 is a schematic block diagram illustrating an exemplary system for training a machine learning model, wherein training data is stored in an NVM array that is accessed by a hardware or firmware data sample selection unit of a data storage device that is an on-chip chip component of the NVM.

FIG. 7 illustrates an alternative implementation deep learning system 700 where a data sample selection unit is implemented on the NVM die as an on-chip processor (using, for example, under-the-array circuitry). Briefly, a large training data set 702 is obtained via an input interface 704 and loaded into an NVM 705 of a DSD 706. The NVM 705 also includes a data sample selection unit 707 (or portions of a data sample selection component) for use in intelligently selecting data samples 710 for sending to a machine learning computation unit 708 for processing in accordance with network configuration parameters and related training related parameters 712. Whenever the machine learning computation unit 708 needs a new group of data samples 710, the machine learning computation unit 708 sends a signal 714 (such as a "ready" signal) to the DSD 706, which is routed to and processed by the on-chip data sample selection unit 707. Eventually, upon completion of the training, parameters defining the trained model 716 are output via an output interface 718.

In the following, various general exemplary procedures and systems are described.

Exemplary Processes or Procedures

Figure 8:
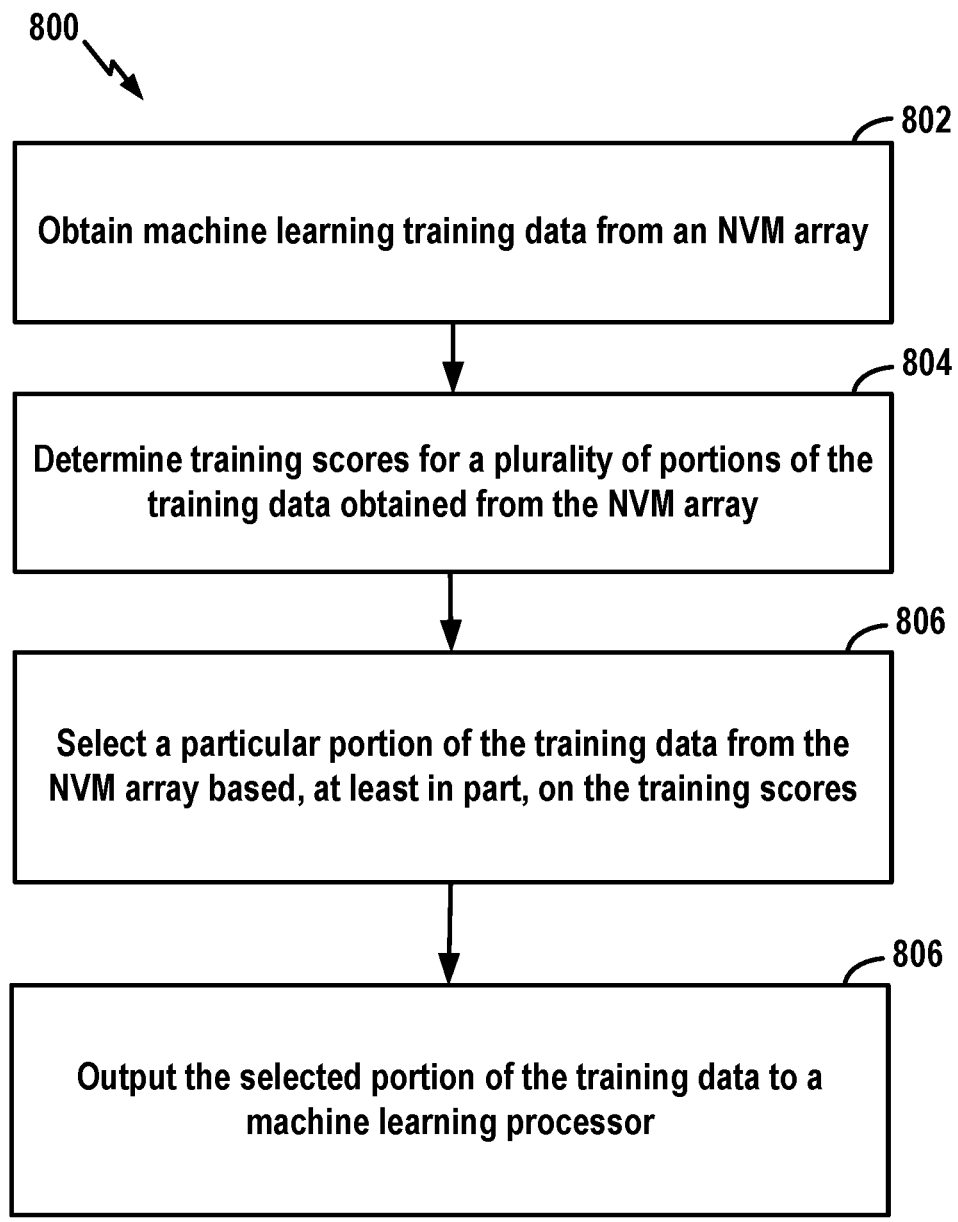
FIG. 8 is a flow chart illustrating an exemplary method according to aspects of the present disclosure for selecting training data from an NVM array.

FIG. 8 illustrates a process 800 in accordance with some aspects of the disclosure. The process 800 may take place within any suitable apparatus or device capable of performing the operations, such as processor 632 of controller 614 of the DSD 610 of FIG. 6 having NVM array. Briefly, at block 802, the processor obtains machine learning training data from an NVM array. At block 804, the processor determines training scores for a plurality of portions of the training data obtained from the NVM array. At block 806, the processor selects a particular portion of the training data from the NVM array based, at least in part, on the training scores. At block 808, the processor outputs the selected portion of the training data to a machine learning processor for use, for example, in training a neural network.

Figure 9:
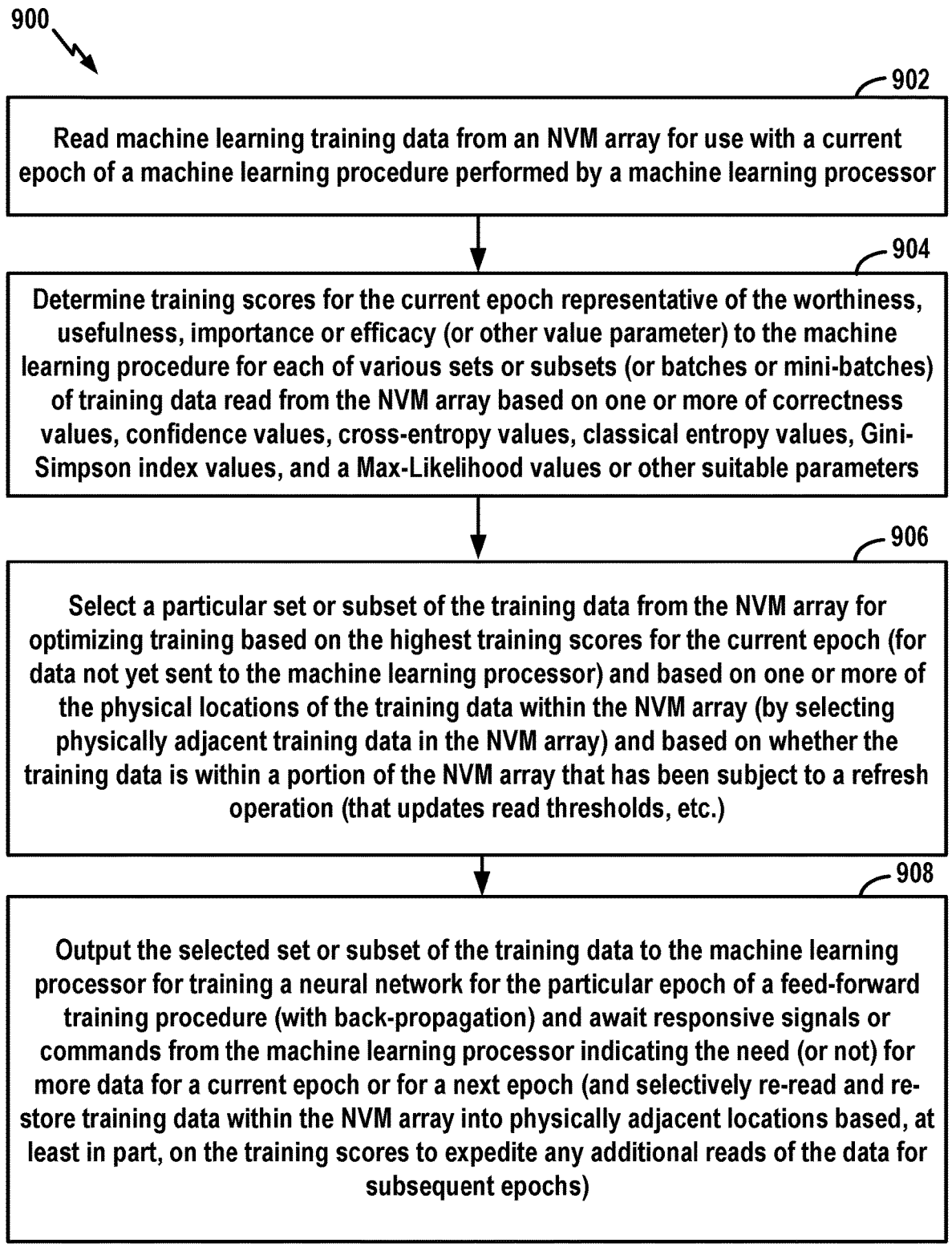
FIG. 9 is a flow chart illustrating additional aspects of an exemplary method for selecting training data from an NVM array.

FIG. 9 illustrates another process 900 in accordance with some aspects of the disclosure. The process 900 may take place within any suitable apparatus or device capable of performing the operations, such as processor 632 of controller 614 of the DSD 610 of FIG. 6 having NVM array. Briefly, at block 902, the processor reads machine learning training data from an NVM array for use with a current epoch of a machine learning procedure performed by a machine learning processor. At block 904, the processor determines training scores for the current epoch representative of the worthiness, usefulness, importance or efficacy (or other value parameter) to the machine learning procedure for each of various sets or subsets (or batches or mini-batches) of training data read from the NVM array based on one or more of correctness values, confidence values, cross-entropy values, classical entropy values, Gini-Simpson index values, and a Max-Likelihood values or other suitable parameters.

At block 906, the processor selects a particular set or subset of the training data from the NVM array for optimizing training based on the highest training scores for the current epoch (for data not yet sent to the machine learning processor) and based on one or more of the physical locations of the training data within the NVM array (by selecting physically adjacent training data in the NVM array) and based on whether the training data is within a portion of the NVM array that has been subject to a refresh operation (that updates read thresholds, etc.). At block 908, the processor outputs the selected set or subset of the training data to the machine learning processor for training a neural network for the particular epoch of a feed-forward training procedure (with back-propagation) and awaits responsive signals or commands from the machine learning processor indicating the need (or lack of need) for more data for a current epoch or for a next epoch. At block 908, the processor may also selectively re-read and re-store training data within the NVM array into physically adjacent locations based, at least in part, on the training scores to expedite additional reads of the data for subsequent epochs). That is, the processor may read data that is currently stored at various separated locations within the NVM array and then write that data into physically adjacent locations, such as into adjacent word lines. Thereafter, the data can be read more quickly and easily. This may be referred to as "re-storing" the data. In other words, the processor may be configured to selectively read training data from the NVM array from a first set of locations and then store the same training data into a second set of locations that are physically adjacent to one another, wherein the selection of the training data of the first set of locations is based, at least in part, on the training scores. In some examples, samples with high training scores are selected for re-storing, whereas samples with lower training scores are not selected for this procedure.

Exemplary Apparatus

Figure 10:
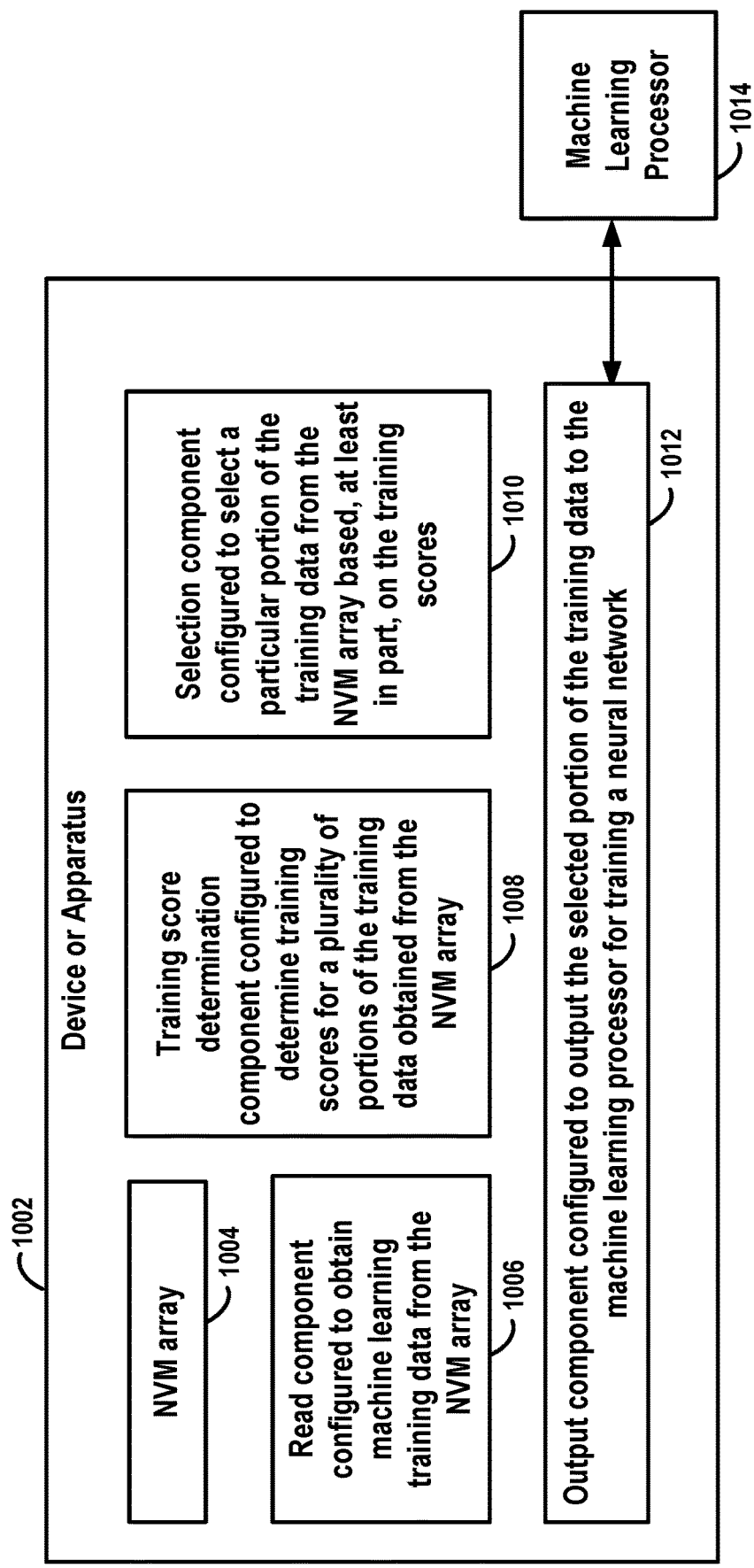
FIG. 10 is a schematic block diagram configuration of an exemplary device or apparatus having an NVM array for use with a separate machine learning processor.

FIG. 10 illustrates an apparatus or device configured in accordance with some aspects of the disclosure. The device 1002 may by any suitable apparatus or device capable of performing the operations, such as processor of a data storage controller of a DSD having an NVM array. Briefly, the device 1002 includes an NVM array 1004 and a read component 1006 configured to obtain machine learning training data from the NVM array 1004. A training score determination component 1008 is configured to determine training scores for a plurality of portions of the training data obtained from the NVM array 1004. A selection component 1010 is configured to select a particular portion of the training data from the NVM array based, at least in part, on the training scores. An output component 1012 is configured to output the selected portion of the training data to a machine learning processor 1014 for training a neural network, such as a DNN.

In at least some examples, means may be provided for performing the functions discussed above in connection with FIG. 8 and/or other functions illustrated or described herein. For example, means (such as component 1006 of FIG. 10) may be provided for obtaining machine learning training data from the NVM array. Means (such as component 1008 of FIG. 10) may be provided for determining training scores for a plurality of portions of the training data obtained from the NVM. Means (such as component 1010 of FIG. 10) may be provided for selecting a particular portion of the training data from the NVM array based, at least in part, on the training scores. Means (such as component 1012 of FIG. 10) may be provided for outputting the selected portion of the training data to the machine learning processor for training a neural network.

Figure 11:
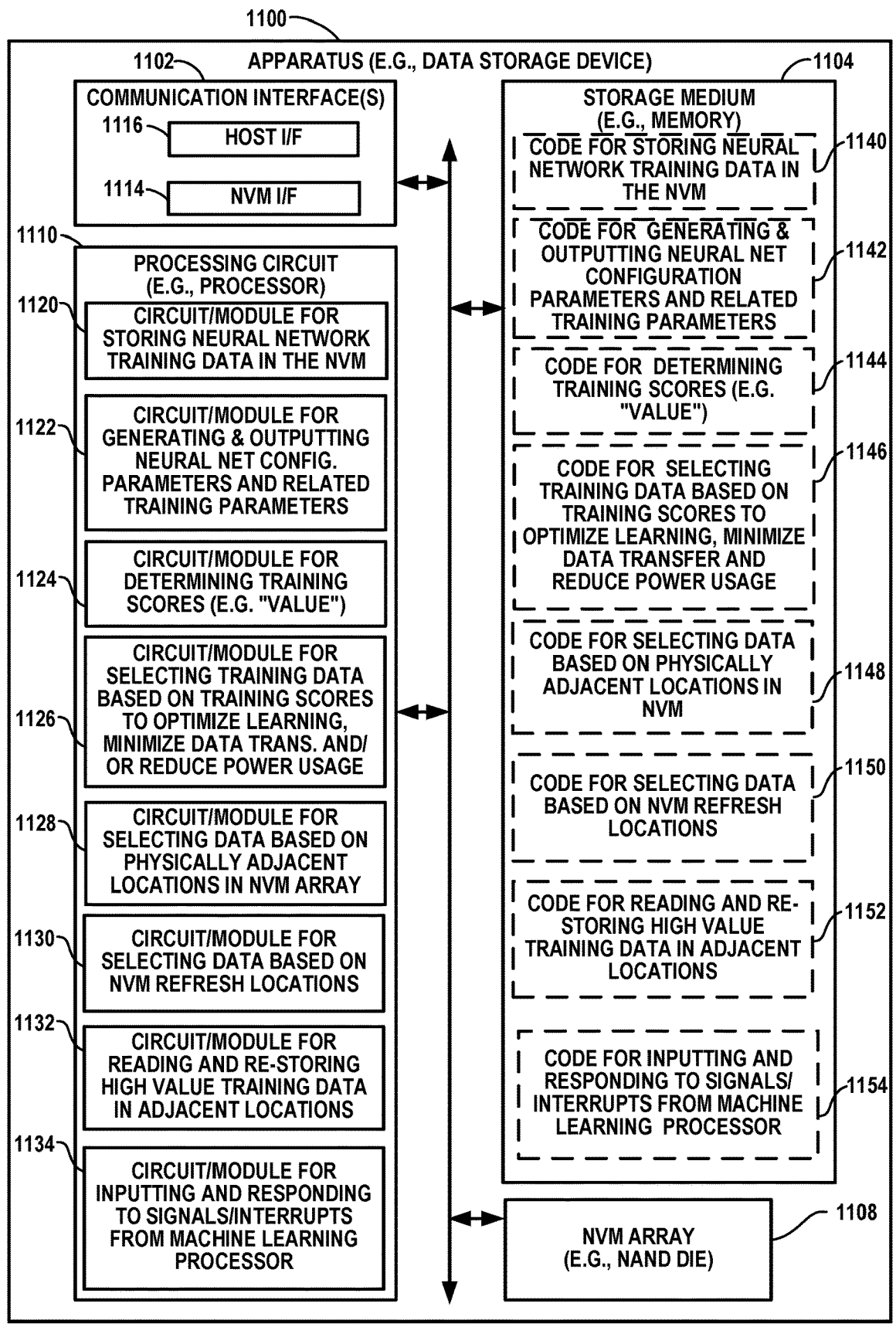
FIG. 11 is a schematic block diagram illustrating an exemplary data storage apparatus, such as a data storage device having an NVM array.

FIG. 11 illustrates an embodiment of an apparatus 1100 configured according to one or more other aspects of the disclosure. The apparatus 1100, or components thereof, could embody or be implemented within a DSD, a processor, a controller, an SSD controller, a host device, or some other type of device that processes data or controls data storage. In various implementations, the apparatus 1100, or components thereof, could embody or be implemented within a computing device, a personal computer, a portable device, or workstation, a server, a personal digital assistant, a digital camera, a digital phone, an entertainment device, a medical device, a self-driving vehicle control device, or any other electronic device.

The apparatus 1100 includes a communication interface 1102, a storage medium 1104, an NVM array (e.g., one or more NAND dies) 1108, and a processing circuit 1110 (e.g., at least one processor and/or other suitable circuitry). These components can be coupled to and/or placed in electrical communication with one another via a signaling bus or other suitable component, represented generally by the connection lines in FIG. 11. The signaling bus may include any number of interconnecting buses and bridges depending on the specific application of the processing circuit 1110 and the overall design constraints. The signaling bus links together various circuits such that each of the communication interface 1102, the storage medium 1104, and the memory array 1108 are coupled to and/or in electrical communication with the processing circuit 1110. The signaling bus may also link various other circuits (not shown) such as timing sources, peripherals, voltage regulators, and power management circuits, which are well known in the art, and therefore, will not be described any further.

The communication interface 1102 provides a means for communicating with other devices or apparatuses over a transmission medium. In some implementations, the communication interface 1102 includes circuitry and/or programming (e.g., a program) adapted to facilitate the communication of information bi-directionally with respect to one or more devices in a system. In some implementations, the communication interface 1102 may be configured for wire-based communication. For example, the communication interface 1102 could be a bus interface, a send/receive interface, or some other type of signal interface including drivers, buffers, or other circuitry for outputting and/or obtaining signals (e.g., outputting signal from and/or receiving signals into an integrated circuit). The communication interface 1102 serves as one example of a means for receiving and/or a means for transmitting.

The NVM array 1108 may represent one or more memory devices. In some implementations, the NVM array 1108 and the storage medium 1104 are implemented as a common memory component. The memory array 1108 may be used for storing data that is manipulated by the processing circuit 1110 or some other component of the apparatus 1100.

The storage medium 1104 may represent one or more computer-readable, machine-readable, and/or processor-readable devices for storing programming, such as processor executable code or instructions (e.g., software, firmware), electronic data, databases, or other digital information. The storage medium 1104 may also be used for storing data that is manipulated by the processing circuit 1110 when executing programming. The storage medium 1104 may be any available media that can be accessed by a general purpose or special purpose processor, including portable or fixed storage devices, optical storage devices, and various other mediums capable of storing, containing or carrying programming.

By way of example and not limitation, the storage medium 1104 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a RAM, ROM, PROM, EPROM, an EEPROM, ReRAM, a register, a removable disk, and any other suitable medium for storing software and/or instructions that may be accessed and read by a computer. The storage medium 1104 may be embodied in an article of manufacture (e.g., a computer program product). By way of example, a computer program product may include a computer-readable medium in packaging materials. In view of the above, in some implementations, the storage medium 1104 may be a non-transitory (e.g., tangible) storage medium. For example, the storage medium 1104 may be a non-transitory computer-readable medium storing computer-executable code, including code to perform operations as described herein.

The storage medium 1104 may be coupled to the processing circuit 1110 so that the processing circuit 1110 can read information from, and write information to, the storage medium 1104. That is, the storage medium 1104 can be coupled to the processing circuit 1110 so that the storage medium 1104 is at least accessible by the processing circuit 1110, including examples where at least one storage medium is integral to the processing circuit 1110 and/or examples where at least one storage medium is separate from the processing circuit 1110 (e.g., resident in the apparatus 1100, external to the apparatus 1100, distributed across multiple entities, etc.).

Programming stored by the storage medium 1104, when executed by the processing circuit 1110, causes the processing circuit 1110 to perform one or more of the various functions and/or process operations described herein. For example, the storage medium 1104 may include operations configured for regulating operations at one or more hardware blocks of the processing circuit 1110, as well as to utilize the communication interface 1102 for wireless communication utilizing their respective communication protocols.

At least some of the processing circuits described herein are generally adapted for processing, including the execution of such programming stored on a storage medium such as storage medium 1104. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein are arranged to obtain, process and/or send data, control data access and storage, issue commands, and control other desired operations. For example, the processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuits may also be implemented as a combination of computing components, such as a combination of a controller and a microprocessor, a number of microprocessors, one or more microprocessors in conjunction with an ASIC and a microprocessor, or any other number of varying configurations. These examples of processing circuits are for illustration and other suitable configurations within the scope of the disclosure are also contemplated.

According to one or more aspects of the disclosure, the processing circuit 1110 may be adapted to perform any or all of the features, processes, functions, operations and/or routines for any or all of the controller apparatuses described herein. For example, the processing circuit 1110 may be configured to perform any of the steps, functions, and/or processes described with respect to FIGS. 2-10. As used herein, the term "adapted" in relation to the processing circuit 1110 may refer to the processing circuit 1110 being one or more of configured, employed, implemented, and/or programmed to perform a particular process, function, operation and/or routine according to various features described herein. The processing circuit 1110 may be a specialized processor, such as an ASIC that serves as a means for (e.g., structure for) carrying out any one of the operations described in conjunction with FIGS. 2-10. The processing circuit 1110 serves as one example of a means for processing. In various implementations, the processing circuit 1110 may provide and/or incorporate, at least in part, the functionality described above for the controller 408 of FIG. 4.

According to at least one example of the apparatus 1100, the processing circuit 1110 may include one or more of: a circuit/module 1120 for storing neural network training data in the NVM array 1108; a circuit/module 1122 for generating and outputting (to an external machine learning processor) neural net configuration parameters and related training parameters (e.g. hyper parameters); a circuit/module 1124 for determining training scores (e.g. training "value") based, for example, on one or more of correctness values, confidence values, cross-entropy values, classical entropy values, Gini-Simpson index values, and a Max-Likelihood values or other suitable parameters; a circuit/module 1126 for selecting training data based on training scores to optimize learning, minimize data transfer and/or reduce power usage; a circuit/module 1128 for selecting data based on physically adjacent locations in the NVM array 1108, so as to reduce NVM read times and NVM read power consumption; a circuit/module 1130 for selecting data based on NVM refresh locations, so as to reduce NVM read times and NVM read power consumption by exploiting portions of the NVM array that have been recently refreshed with refresh operation; a circuit/module 1132 for reading and re-storing high value training data in adjacent locations, so as to reduce NVM read times and NVM read power consumption by placing high value data in physically adjacent locations; and a circuit/module 1134 for inputting and responding to signals/interrupts from the (external) machine learning processor, such as the above-described DO_SELECT signals, DONE signals, etc., and information regarding particular epochs that are being processed.

As mentioned above, a program stored by the storage medium 1104, when executed by the processing circuit 1110, causes the processing circuit 1110 to perform one or more of the various functions and/or process operations described herein. For example, the program may cause the processing circuit 1110 to perform and/or control the various functions, steps, and/or processes described herein with respect to FIGS. 2019, including operations performed by a NAND die. As shown in FIG. 11, the storage medium 1104 may include one or more of: code 1140 for storing neural network training data in the NVM 1108; code 1142 for generating and outputting neural net configuration parameters and related training parameters (e.g. hyper parameters); code 1144 for determining training scores (e.g. training "value") based, for example, on one or more of correctness values, confidence values, cross-entropy values, classical entropy values, Gini-Simpson index values, and a Max-Likelihood values or other suitable parameters; code 1146 for selecting training data based on training scores to optimize learning, minimize data transfer and/or reduce power usage; code 1148 for selecting data based on physically adjacent locations in the NVM array 1108, so as to reduce NVM read times and NVM read power consumption; code 1150 for selecting data based on NVM refresh locations, so as to reduce NVM read times and NVM read power consumption by exploiting portions of the NVM array that have been recently refreshed with refresh operation; code 1152 for reading and re-storing high value training data in adjacent locations, so as to reduce NVM read times and NVM read power consumption by placing high value data in physically adjacent locations;

code 1154 for inputting and responding to signals/interrupts from the (external) machine learning processor, such as the above-described DO_SELECT signals, DONE signals, etc., and information regarding particular epochs that are being processed.

In at least some examples, means may be provided for performing the functions illustrated in FIG. 11 and/or other functions illustrated or described herein. For example, the means may include one or more of: means, such as circuit/module 1120, for storing neural network training data in the NVM array 1108; means, such as circuit/module 1122, for generating and outputting (to an external machine learning processor) neural net configuration parameters and related training parameters (e.g. hyper parameters); means, such as circuit/module 1124, for determining training scores (e.g. training "value") based, for example, on one or more of correctness values, confidence values, cross-entropy values, classical entropy values, Gini-Simpson index values, and a Max-Likelihood values or other suitable parameters; means, such as circuit/module 1126, for selecting training data based on training scores to optimize learning, minimize data transfer and/or reduce power usage; means, such as circuit/module 1128, for selecting data based on physically adjacent locations in the NVM array 1108, so as to reduce NVM read times and NVM read power consumption; means, such as circuit/module 1130, for selecting data based on NVM refresh locations, so as to reduce NVM read times and NVM read power consumption by exploiting portions of the NVM array that have been recently refreshed with refresh operation; means, such as circuit/module 1132, for reading and re-storing high value training data in adjacent locations, so as to reduce NVM read times and NVM read power consumption by placing high value data in physically adjacent locations; and means, such as circuit/module 1134, for inputting and responding to signals/interrupts from the (external) machine learning processor.

Additional Aspects

Aspects of the subject matter described herein can be implemented in any suitable NAND flash memory, such as 3D NAND flash memory. Semiconductor memory devices include volatile memory devices, such as DRAM) or SRAM devices, NVM devices, such as ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration. The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, and C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "one or more of: A, B, or C" is intended to cover A, B, C, A-B, A-C, B-C, and A-B-C, as well as multiples of the same members (e.g., any lists that include AA, BB, or CC). Likewise, "one or more of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage device, comprising:
a non-volatile memory (NVM) array; and
a data processor configured to
obtain machine learning training data from the NVM array,
determine NVM storage attributes for a plurality of portions of the training data,
determine neural network training scores for the plurality of portions of the training data obtained from the NVM array based on the NVM storage attributes and on relative values of the portions of the training data to the training of a neural network,
select a particular portion of the training data from the NVM array based, at least in part, on the neural network training scores, and
output the selected portion of the training data to a machine learning processor for training the neural network.

2. The data storage device of claim 1, wherein the data processor is further configured to determine the training scores for each epoch of a plurality of epochs of a machine learning training procedure of the machine learning processor.

3. The data storage device of claim 2, wherein the data processor is further configured to select the particular portion of the training data during each epoch based on a highest training score from among portions of training data not yet output to the machine learning processor.

4. The data storage device of claim 2, wherein the data processor is further configured to selectively determine new training scores for a particular epoch in response to a control signal received from the machine learning processor requesting new training scores.

5. The data storage device of claim 1, wherein the data processor is further configured to selectively read the training data from the NVM array from a first set of locations and then store the same training data into a second set of locations that are physically adjacent to one another, wherein the selection of the training data of the first set of locations is based, at least in part, on the training scores.

6. The data storage device of claim 1, wherein at least a portion of the data processor is configured as a component of a memory die having the NVM array.

7. The data storage device of claim 1, wherein the machine learning processor is external to the data storage device.

8. The data storage device of claim 1, wherein the machine learning processor is a component of a host device coupled to the data storage device.

9. The data storage device of claim 1, wherein the NVM storage attributes are configured to indicate, for each portion of the training data, whether the portion is stored within a same NVM storage block or wordline as at least one other of the portions of the training data.

10. The data storage device of claim 1, wherein the NVM storage attributes are configured to indicate, for each portion of the training data, whether the portion has been subjected to an NVM refresh operation.

11. The data storage device of claim 10, wherein the data processor is further configured to determine the training scores by assigning a first portion of the training data a higher training score than a second portion of the training data when the NVM attributes indicate that the first portion has been subjected to the NVM refresh operation but the second portion has not been subjected to the NVM refresh operation.

12. The data storage device of claim 1, wherein the data processor is further configured to determine a correlation among the NVM storage attributes of the portions of the training data, and to determine the training scores by assigning the training scores based, at least in part, on the correlation.

13. The data storage device of claim 1, wherein the relative values of the portions of the training data to the training of a neural network comprise one or more of correctness values, confidence values, cross-entropy values, classical entropy values, Gini-Simpson index values, and Max-Likelihood values.

14. A method for machine learning using data storage device including a non-volatile memory (NVM) array, the method comprising:
obtaining machine learning training data from the NVM array;
determining NVM storage attributes for a plurality of portions of the training data;
determining neural network training scores for the plurality of portions of the training data obtained from the NVM array based on the NVM storage attributes and on relative values of the portions of the training data to the training of a neural network;
selecting a particular portion of training data from the NVM array based, at least in part, on the neural network training scores; and
transferring the selected portion of training data to a machine learning processor for training the neural network.

15. The method of claim 14, further comprising determining the training scores for each epoch of a plurality of epochs of a machine learning training procedure of the machine learning processor.

16. The method of claim 15, further comprising selecting the particular portion of training data during each epoch based on a highest training score from among sets of training data not yet transferred to the machine learning processor.

17. The method of claim 16, further comprising selectively determining new training scores for a particular epoch in response to a control signal received from the machine learning processor requesting new training scores.

18. The method of claim 14, further comprising determining the training scores based on one or more of correctness values, confidence values, cross-entropy values, classical entropy values, Gini-Simpson index values, and Max-Likelihood values.

19. The method of claim 14, further comprising selecting the particular portion of training data from the NVM array based, at least in part, on physical locations of the training data within the NVM array.

20. The method of claim 19, further comprising selecting the particular portion of training data from the NVM array based on the physical locations of the training data by selecting physically adjacent training data in the NVM array.

21. The method of claim 14, further comprising selectively reading and re-storing the training data within the NVM array into physically adjacent locations based, at least in part, on the training scores.

22. The method of claim 14, further comprising selecting the particular portion of training data from the NVM array based on whether the training data is within a portion of the NVM array that has been subjected to a refresh operation.

23. An apparatus for use with a data storage device, comprising:
- means for obtaining machine learning training data from a non-volatile memory (NVM) array;
- means for determining NVM storage attributes for a plurality of portions of the training data,
- means for determining neural network training scores for the plurality of portions of the training data obtained from the NVM based on the NVM storage attributes and on relative values of the portions of the training data to the training of a neural network;
- means for selecting a particular portion of the training data from the NVM array based, at least in part, on the neural network training scores; and
- means for outputting the selected portion of the training data to a machine learning processor for training the neural network.

* * * * *